Dec. 27, 1955     A. C. PETERSON     2,728,404
POWER STEERING USING HYDRAULIC MOTORS
Filed April 16, 1951     3 Sheets-Sheet 1

INVENTOR.
Adolph C. Peterson.

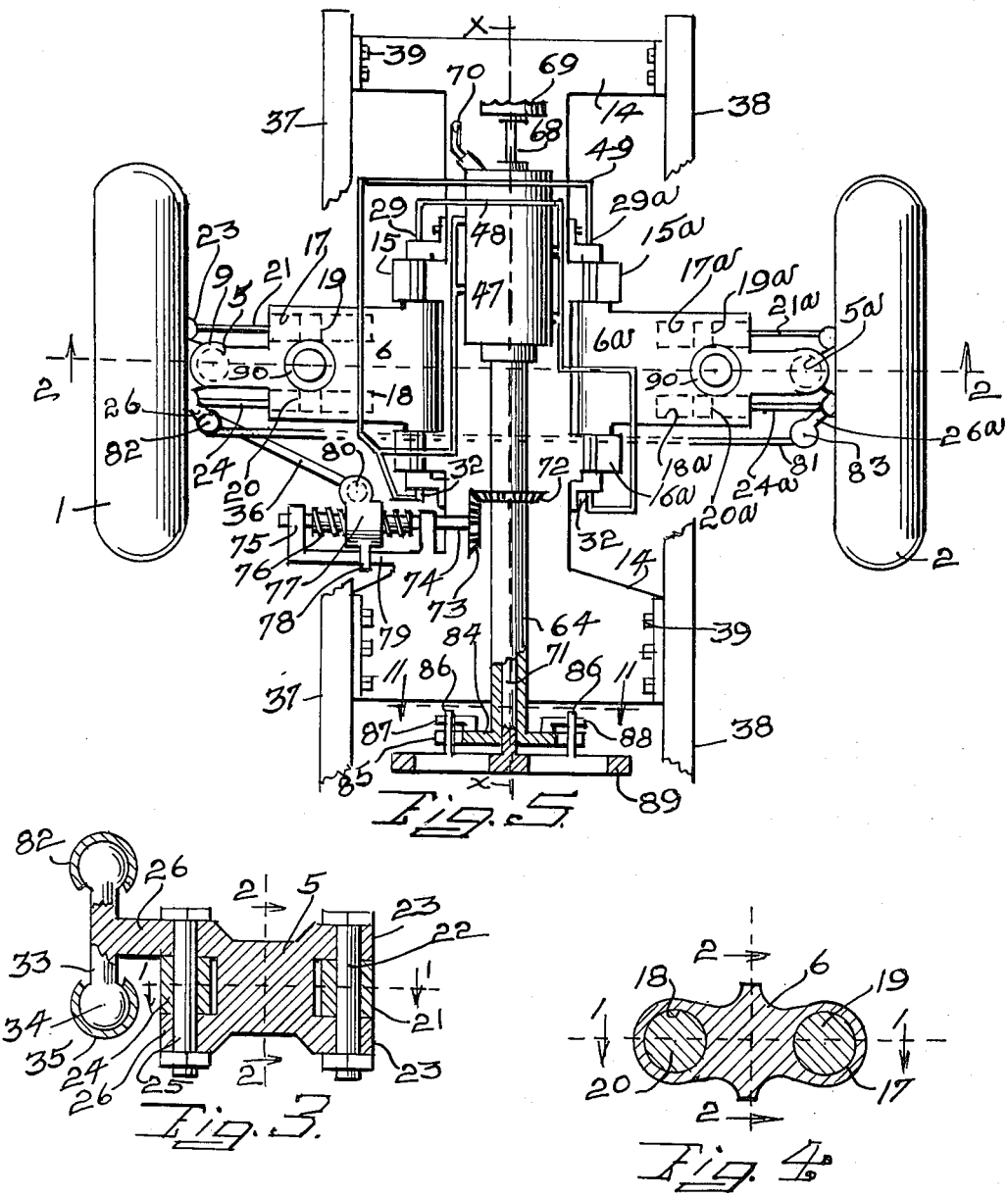

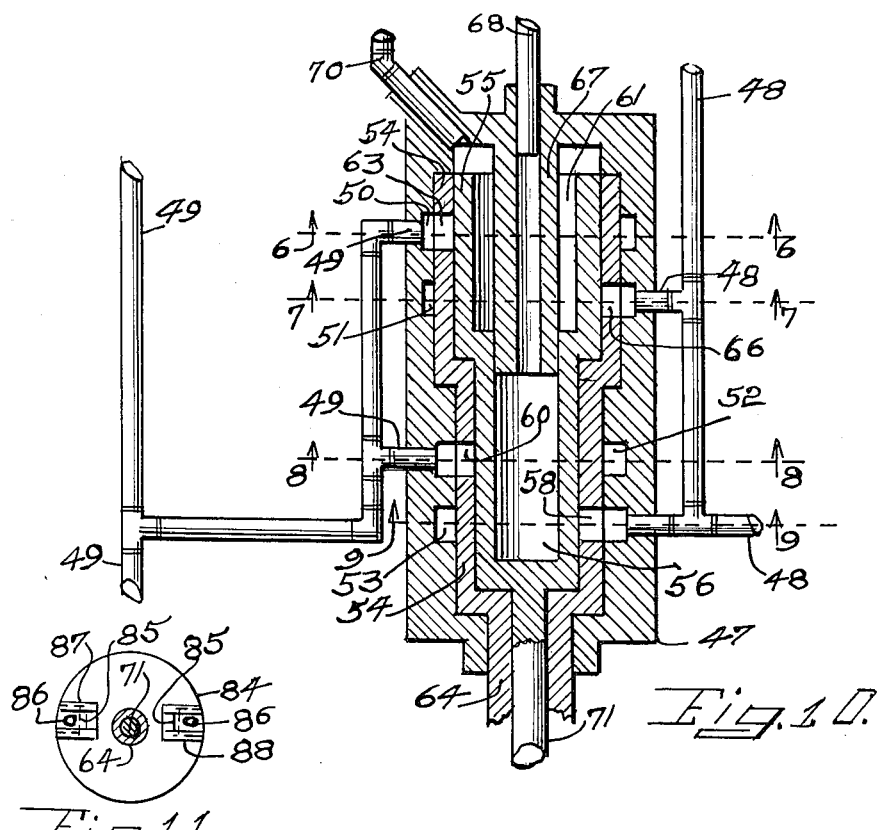
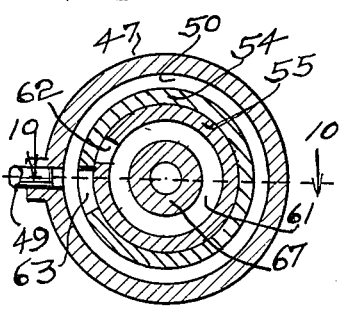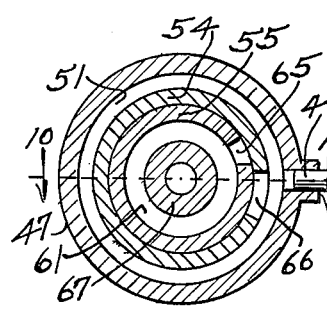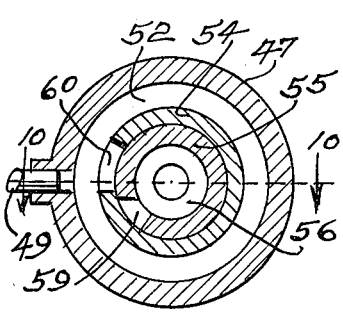
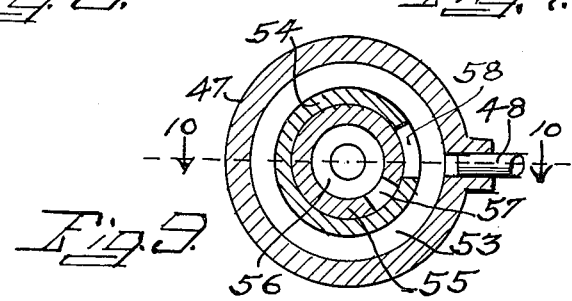
INVENTOR.
Adolphe Peterson.

United States Patent Office 2,728,404
Patented Dec. 27, 1955

2,728,404

POWER STEERING USING HYDRAULIC MOTORS

Adolphe C. Peterson, Edina, Minn.

Application April 16, 1951, Serial No. 221,149

4 Claims. (Cl. 180—79.2)

My invention relates to automobile or vehicle steering means and particularly to powered appliances for steering, so I therefore entitle my invention, Power Steering Means.

The principal objects of my invention are to provide a form of power operated steering means which shall be simple in construction, reliable in action, and relatively cheap in manufacture. An object is to provide a form of such steering means which is combined with the customary form of wheel supporting means in such a manner that the result is a more easily constructed powered steering means and also a more reliable form of power steering means. An object is to provide with such powered steering means a form of manual control in combination therewith which provides for the control of the power steering means and also for manual control to supplement the power steering means in the event that the power steering means should become inoperative. In general the object is to provide improved steering apparatus of the power operated variety for vehicles such as automobiles and trucks and tractors, in a form and combination which may be used to provide adequate and economically constructed power steering for such vehicles.

The principal devices and combinations of devices comprising my invention are as hereinafter described and as defined in the claims. In the accompanying drawings which illustrate my invention like characters refer to like parts throughout the several views. Referring to the drawings:

Figure 1 is a view chiefly in horizontal section on a plane passing through the principal operating elements of the device as associated with one wheel and its supporting bracket or semi-axle by which the wheel is attached to the vehicle, this figure illustrating the section and some parts in full plan view which are located to the left of the vehicle central longitudinal plane which is designated by the dash-dot line designated by the letters X—X. This section is a section on the lines 1—1 of Figures 2, 3, 4, Figure 2 is a section on a vertical plane, similarly from the plane or line X—X, leftwardly, on the line 2—2 of Figures 1, 3 and 4, some parts being illustrated in part or wholly in full side elevation.

Figure 3 is a detail section on the line 3—3 of Figure 1, looking leftwardly, and illustrating the connections of the connecting rods for power steering, to the individual wheel spindle.

Figure 4 is a detail section on the line 4—4 of Figures 1 and 2, looking leftwardly.

Figure 1:
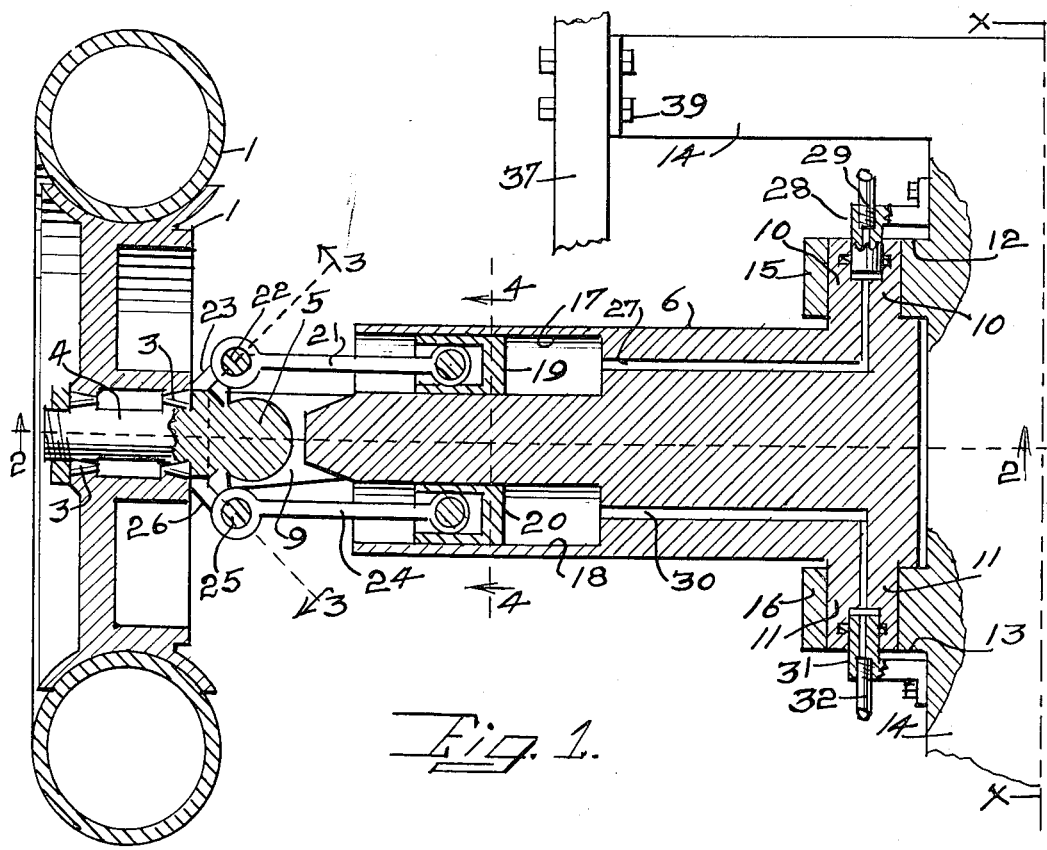

Figure 5 is a plan view of the front part of an automobile chassis, showing the pair of steering wheels as applied to the chassis frame, and viewing the principal elements of the power steering means, as applied to both front or steering wheels of the automobile, and showing the power and manual control means for the power steering means, the manual steering wheel and some associated parts being in section through the axis of the steering wheel. This view is on a scale approximatelly one-half that of Figures 1 and 2.

Figures 6, 7, 8, 9, are vertical sections on the lines 6, 7, 8, 9, of Figure 10, all these valve sections, being shown as viewed looking toward the top of the Figure 5.

Figure 10 is an enlarged view of the valve casing 47 and its interior valve means, and associated conduits, the valve casing and valve means being in section through the axis of rotation of the valve means, this section being on a plane on the lines 10—10 of Figures 6, 7, 8, 9.

Figure 11 is a section on the line 11—11 of Figure 5, looking downwardly in Figure 5, and viewing the driver's steering wheel below the section.

It will be noted that each of the two front steering wheels of the associated automobile has the elements for steering associated with it as are illustrated in Figures 1, 2, 3, 4, the relative directions of some parts being reversed for the right hand wheel. The construction will be described with reference to the left hand wheel, illustrated in Figures 1 and 2.

Referring now chiefly to Figures 1, 2, 3, 4, the left steering wheel is designated 1 (the right is designated 2), and this wheel is rotatably mounted by the usual roller bearing means 3 or any type of bearing means, on the wheel spindle 4, and the wheel spindle 4 is formed integrally with the vertical pivot bearing member 5. By the member 5, the wheel is pivoted for steering and mounted in the left end of the wheel semi-axle or bracket 6 by means of the pivot bolts 7 and 8 which are passed through the bifurcated end 9 of the semi-axle 6 and secured in the member 5. The opposite end of the semi-axle 6 has forwardly and rearwardly extending pivot pins 10 and 11, respectively, formed with it and by these pivot pins 10, 11, the semi-axle 6 is pivotably mounted and fixed with and in the bearings or bearing brackets 12, 13, respectively, formed with a longitudinal chassis frame member 14, the latter being centrally located in the horizontal plane of the chassis. The bearing brackets 12, 13 have bearing caps 15, 16 bolted to the bearing brackets, thereby securing the wheel supporting semi-axle 6 in place and so that the wheel by its semi-axle 6 may swing in the transverse vertical plane designated by line 2—2 of Figure 1.

The semi-axle 6 has formed integrally with it or firmly secured to it a pair of power cylinders 17, 18, respectively, one being located on each side of the line 2—2, Fig. 1, and offset from that line, which is the line through the wheel spindle 4, a sufficient distance to permit easy functioning of the operating elements, as hereinafter described. Each of the power cylinders 17, 18, is so formed or located, that the axis of its bore lies in the horizontal plane and extends parallel with or substantially or nearly parallel with the line 2—2 of Fig. 1, and each is closed at its end nearest line X—X, and is open, at its end facing toward wheel 1, except as closed by one of the two pistons 19, 20, one of which is reciprocably mounted in each of the power cylinders 17, 18.

The piston 19 is flexibly connected with the near end of a connecting rod 21, which at its remote end is pivotably mounted on the pivot pin or bolt 22 which is secured vertically in and passing through the two members of a bracket 23 formed integrally with or firmly secured to the wheel spindle 4 (Figures 1 and 3). The piston 20 is flexibly connected with the near end of a connecting rod 24 which at its remote end is pivotably mounted on the pivot-pin or bolt 25 which is secured vertically in and passing through the two members of a bracket 26 formed integrally with the wheel spindle 4 but on the opposite side of the spindle from that where the bracket 23 is formed. These brackets 23 and 26 are strongly formed with the wheel spindle and are on opposite sides of the plane passing vertically through the axis of the wheel spindle 4 and each is sufficiently removed from that plane, so that the pistons 19 and 20, acting through the connecting rods 21 and 24, respectively, may exert power in a sufficiently efficient manner to push the pivot pin 22 or the pivot pin 25 and with it the wheel spindle with the wheel 1, about the axis of the pivot bolts 7 and 8 and member 5, thereby swinging the wheel spindle 4 and wheel 1 about its pivoting axis in the horizontal plane. The vertical plane designated by line 2—2, Figure 1, passes through the horizontal axis of the wheel 1 and the vertical axis of the pivot bolts 7, 8. The pistons 19, 20 reciprocate horizontally in the semi-axle 6, parallel to line 2—2 or nearly parallel thereto but the axes of the cylinders 17, 18 may be inclined slightly, relatively to the vertical plane passing through line 2—2, Fig. 1, and they may also be inclined slightly to the horizontal plane, designated by line 1—1, Fig. 2, if either of such inclinations is desired for improving the efficiency of the operation of the device.

The power cylinder 17 has an associated conduit 27 opening to its closed end and this conduit is formed in semi-axle 6 and passes through pivot pin 10, so that there may be flow from and to cylinder 17 by means of a bearing conduit 28 bracketed to chassis member 14, delivering into and out of conduit 29, the pivot pin 10 being mounted to oscillate freely on the bearing conduit 28, but being so tightly fitted and bearing packed that there will be relatively no leakage.

The power cylinder 18 has an associated conduit 30 opening to its closed end and this conduit is formed in semi-axle 6 and passes through pivot pin 11, so that there may be flow from and to cylinder 18 by means of a bearing conduit 31 bracketed to chassis member 14, delivering into and out of conduit 32, the pivot pin 11 being mounted to oscillate freely on the bearing conduit 31, but being so tightly fitted and bearing packed that there will be insignificant leakage, or none at all. The wheel spindle 4 has formed integrally with it and its bearing bracket 26 a short depending rod 33 on the lower end of which is formed the ball 34 which is the one part of a ball and socket joint formed by ball 34 and the socket 35, the latter being formed on the near end of a link arm 36.

The foregoing description of the supporting and controlling parts associated with the one road wheel 1 and adjacent or attached therewith, will describe the elements likewise associated with the other or opposite road wheel 2 of the automobile. As far as such parts associated with road wheel 2 are visible in the relatively smaller Figure 5, these visible parts are designated by the same numerals with the letter *a* attached. It should be noted, however, that the opposite road wheel 2 is mounted as the road wheel 1 is mounted and that it has associated the power cylinders 17a and 18a and pistons 19a and 20a and the connecting rods 21a and 24a and the bearing brackets 15a and 16a by which the semi-axle 6a supporting wheel 2 is oscillatively attached to frame member 14. The frame member 14 is rigidly attached to longitudinal chassis rails 37, 38 by bolts 39.

The pair of road wheels 1 and 2 are coordinated in the rolling and steering movement in part by means of the flow of the fluid under pressure to the cylinders 17, 18, 17a, 18a, which acting upon the pistons 19, 20, 19a, 20a, controls them to keep them in the proper traveling or rolling positions relatively to each other, but this coordination is also maintained by the coordinating and manual steering means as hereafter described.

The conduits 29 and 32, and 29a and 32a, the first pair associated with road wheel 1 and the second pair associated with road wheel 2, may be flexible or rigid conduits but are strong enough to contain a high pressure of fluid within them. The conduits 29a and 32a are connected into the conduits serving cylinders 17a and 18a in the same manner as conduits 29 and 32 are connected into cylinders 17 and 18, the illustration in connection with semi-axle 6 being illustrative also of such similar parts associated with semi-axle 6a. It will be seen in Figure 5 that conduit 29 serving cylinder 17 and conduit 32a serving cylinder 18a are connected into one common conduit 48, and that conduit 32 serving cylinder 18 and conduit 29a serving cylinder 17a are connected into one common conduit 49. Conduit 48 has two connections into the valve housing 47 and conduit 49 has two connections into valve housing 47. One of the connections of common conduit 48 connects through ports with the pressure fluid section of valve housing 47 and the other with the relief section of valve housing 47, and likewise one of the connections of common conduit 49 connects with the pressure fluid section of valve housing 47 and the other connects with the relief section of the valve housing 47. These pressure and relief sections, respectively, of valve housing 47 are hereafter described.

The valve housing 47 has a cylindrical bore within, horizontally placed, longitudinally of the chassis frame, and this cylindrical bore is of two diameters, as shown in Figure 10, and this cylindrical bore has four annular passages formed in the internal side wall of housing 47 each open to the bore and each surrounding it. These annular passages are designated 50, 51, 52, 53, in Figures 6, 7, 8, 9, respectively. Closely fitted into the bore described but rotatable within it is a secondary valve 54, and closely fitted within the two diameter bore of secondary valve 54 but oscillative within it is a primary valve 55. The two valves 54 and 55 are each of two diameters as shown in Figure 10, and Figures 6, 7, 8, 9, the smaller part of each being at one end and the larger part of each at the other end so that they will fit one within the other as shown in Figure 10, at their differing diameter sections. Conduit 29 and conduit 32a connect by means of common conduit 48 and passage 53 with the internal passage or bore 56 in primary valve 55 when the individual port 57 of primary valve 55 is in register with port 58 of secondary valve 54, and this will occur only when the primary valve 55 is turned anticlockwise relatively to secondary valve 54, by the pilot or driver of the automobile. Conduits 29a and 32 (see Figure 8) connect by means of common conduit 49 through annular passage 52 with the internal passage or bore 56 in primary valve 55 when the individual port 59 of primary valve 55 is in register with port 60 of secondary valve 54 and this will occur only when the primary valve 55 is turned clockwisely (rightwardly) relatively to secondary valve 54 by the driver.

Conduits 32 and 29a (see Figure 6) connect by means of common conduit 49 through annular passage 50 with the annular passage 61 (formed by large diameter portion of valve 55) when the individual port 62 of primary valve 55 is in register with port 63 of secondary valve 54 and this will occur only when valve 55 is turned anti-clockwisely. Conduits 29 and 32a (see Figure 7) connect by means of common conduit 48 through annular passage 51 with the annular passage 61 (formed by large diameter portion of valve 55) when the individual port 65 of primary valve 55 is in register with port 66 of secondary valve 54 and this will occur only when the primary valve 55 is turned clockwisely (rightwardly) relatively to secondary valve 54 by the driver.

An axial tubular internal projecting member 67 of valve housing 47 is within the annular passage 61 and partly forms passage 61. Fluid is delivered from conduit 68 and pressure source 69 to the internal bore of primary valve 55 at the small diameter end of primary valve 55. The fluid pressure source 69 is shown as a reservoir and may be any fluid pressure containing reservoir on an automobile chassis, such as the lubricating oil pressure source, but is preferably a source of rather high pressure fluid, as any oil or liquid or air or gas, the pressure being preferably as high as one hundred or more pounds per square inch. The annular passage 61 may discharge and be relieved of fluid pressure by means of a relief conduit 70 connected into that annular passage 61 and which discharges the fluid to any tank or means not shown. The supply of fluid under pressure may be by any means capable of delivering fluid under the required pressure to per-form the necessary function, as hereinafter more particularly described.

The primary valve 55 has firmly connected with it to turn with it a rearwardly projecting shaft 71 which extends axially through the rearward tubular shank or extension 64 of secondary valve 54. At its extreme rear end, the shaft 71 bears fixed on it the manual or driver's steering wheel 89 which is of the usual diameter say approximately twenty inches. The tubular extension 64 has fixed on its rear end the disk or spanner 84 which has a pair of diametrically oppositely located slots 85 in which pins 86 fixed on steering wheel 89 are located. The disk 84 bears fixed thereon, by one end of each two pairs of leaf springs 87, 88, respectively, one pair of which engages on opposite sides of the one of the pins 86 and the other pair of which engages on opposite sides of the other pin 86. By means of this yieldable engagement of springs 87, 88, with pins 86, the steering wheel 74 with its attached valve shaft 71 and primary valve 55 is permitted to turn very slightly, just sufficiently for the port engagements as described hereinafter, relatively to the secondary valve 54, and when the described engagements are effected, the flow of fluid procures the movements of the pistons for effecting steering movements of the wheel spindles.

The tubular extension 64 has fixed on it a bevel gear 72 and this is engaged with bevel gear 73 and the latter is fixed on the shaft 74 which is mounted in bearing bracket 75 and has fixed on it the worm 76, with which an internally screw threaded block 77 is engaged and thereby mounted. The block 77 has a bifurcated slide member 78 which is engaged with top and bottom sides of bracket member 79 so that the latter is between the two members of the bifurcated member 78, and the block 77 is thus held against rotation when it slides longitudinally of worm 76. The block 77 has flexibly connected with it by the ball and socket joint 80 or any other universally jointed means, the near end of the link arm 36. A common tie-rod 81 is flexibly connected, at one end, by ball and socket joint 82 to arm 26 of member 5 and, at the other end, by ball and socket joint 83 to arm 26a of member 5a.

Figure 2:
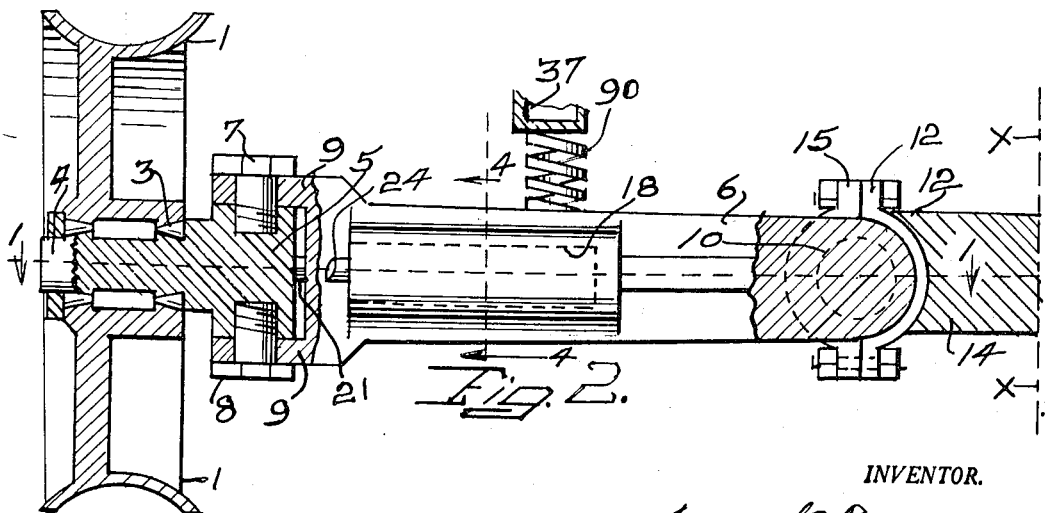

Chassis bearing or yieldably supporting coil springs 90 are indicated in Figure 2, as providing the yieldable support for the chassis frame and automotive vehicle upon the road wheels 1, 2. Any other type of such yieldable support means may be used. In the drawings, Fig. 5, and Figures 6, 7, 8, 9, which are considerably enlarged sections, the control valve means is shown on a rather large scale in proportion to the other elements, it being contemplated that in a production device for use, the valve means may be considerably smaller in proportion and adequately accomplish its function.

In use of my device, the reservoir 69 supplies any fluid under an adequate pressure and continuously or instantaneously available to supply the internal bore of primary valve 55, and as the driver determines, to supply the power cylinders 17, 18, 17a, 18a, as needed. When the driver turns the steering wheel in either direction, the immediate and first effect is to turn the primary valve 55 in the direction determined by the driver's action, and in this slight first effect the pins 86, 86, thrust the associated leaf springs yieldably so that the disk associated with steering wheel 89 is not contacted until immediately after this first effect, so that in the interim the port 57 or the port 59 of primary valve 55 is brought into register with the associated port 58 or 60 of the secondary valve 54, and in this registration the fluid under pressure flows from the bore of primary valve 55 to the selected conduit 48 or 49, and from the selected one thereof through a pair of conduits one delivering to a cylinder 17 or 17a and one delivering to a cylinder 18 or 18a of the opposite road wheel, so that thus fluid under pressure flows to a cylinder 17 or 17a to push the associated piston 19 or 19a in the proper direction and fluid is simultaneously delivered to a cylinder 18 or 18a of the opposite member 6 or 6a, and the combined effect is thus to turn each of the pair of road wheels 1 and 2 in the same direction of travel that is to the left of the vehicle or to the right of the vehicle. Simultaneously with this effect the turning of the primary valve 55 with respect to the secondary valve 54 is to register either the port 62 or the port 65 of the primary valve 55 with the port 63 or 66 of the secondary valve 54 so that fluid will simultaneously flow from the remaining or other one of the cylinders of either member 6 or 6a, that is from the cylinders to which fluid under pressure does not then flow. Thus by turning the steering wheel 89 in either direction the driver may cause fluid to flow under pressure to a pair of cylinders, one in each member 6 and 6a, and simultaneously causes fluid to flow from the other pair of cylinders, one in each member 6 or 6a. At any one time, however, one cylinder of a member 6 or 6a has flow under pressure thereto and the other has relief of pressure therefrom, but this occurs, however, only when the driver positively turns the steering wheel against the pressure of the leaf springs 87 and 88, so as to turn the primary valve 55 relative to secondary valve 54, and the driver turns the steering wheel only when he desires to turn the vehicle. At other times the ports do not register, that is the ports of primary valve 55 do not register with the ports of secondary valve 54, so that there is no flow of fluid either to or from the cylinders 17, 18, 17a, 18a, and this results in the road wheels being held relatively rigidly in their direction of travel, relatively to the chassis frame 37, 38, and during such periods of time the effect of the worm gears, worm 76 and block 77, is also to retain the relative status of the road wheels as to their travel positions.

In the event that there is a failure of pressure in the fluid pressure source or any failure in the conduits, the effect of the worm gears, worm 76 and block 77, is to hold the road wheels in their predetermined relative positions of travel, until the driver manually turns the wheel 89, and thereupon the driver may forcibly turn the steering wheel 89 and through the cooperation of the bevel gears 72, 73, associated with worm gears, worm 76, block 77, the link arm 36 and tie-rod 81, will be moved to turn the road wheels 1, 2 as necessary for steering or direction of the vehicle, without the servo-effect of the power steering means which has been described.

In all movements, when the power steering means is operating effectively, the engagement of bevel gears 72, 73, and the torque effect through the worm 76 and block 77, will be only as the flow of the power steering fluid determines, since the power steering effect will be always in advance of the manual steering effect. While the power steering effect is normally in advance of the manual steering effect through the worm 76 and block 77, the power steering by means of the fluid passing to any of the cylinders 17, 18, 17a, 18a, is always under the restraining control of the worm 76 and block 77 and the tie-rod 81, since the rotation of the worm 76 is proportional to the manual turning of the steering wheel 89. This restraining effect of the worm 76 and block 77 is also effective to control the movements of the road wheels 1 and 2, so that these movements of the road wheels, for steering action, is thereby coordinated as is necessary for the proper and coordinated travel of the road wheels in turning movements of the chassis 37, 38. Only the front steering wheel portion of the chassis frame is shown, it being contemplated that the chassis frame members will have the customary rear road wheels mounted with it as is customary in chassis construction, and such rear portion and rear wheels are therefore not shown.

It should be noted that the power steering elements would in any construction be proportioned according to the characteristics desired in the particular construction. For instance in some constructions it may be desirable to have the power steering means be so powerful that at any time when the driver determines to change the course of the automotive vehicle he is driving, the power steering means will provide all the power or effort needed to turn the road wheels 1, 2, and the driver need in such a construction provide only the effort needed to overcome the tension of the springs 87, 88, which need be very little, and to turn the control valve 55 within the valve 54. In some constructions it may be desirable to proportion the power steering means so that at any time the power elements provide only say one half to three-fourths or thereabouts, more or less, of the power required for effecting the steering movements of the road wheels 1, 2, the driver then providing the required additional effort needed to procure the turning movements. This proportioning of power required between the power elements and the driver would in any construction be such as is determined to provide the most efficient means and the best driver reaction and control, and to provide the least fatigue of the driver in the operation of driving.

The control valve means may be stationed in any manner and may be proportioned in any manner, and designed or organized in any manner which will provide the control as designated and described, with the lightest and most effective means.

While I have shown particular elements and combinations of elements in the illustration of my invention, I contemplate that other detailed elements and combinations of elements may be utilized in the realization of my invention, without departing from the spirit and contemplation of my invention.

What I claim is:

1. A wheel supporting member pivoted at one end on a vehicle frame member for oscillation substantially in the vertical plane, a road wheel spindle pivoted to said supporting member for oscillation in the horizontal plane, a road wheel mounted for rotation on said spindle, a pair of cylinder bores formed in said supporting member and with their axes substantially horizontal and parallel and extended in the supporting member longitudinally thereof, a pair of pistons each reciprocable in one of said cylinders, a pair of link members one connecting one side of the road wheel spindle to one of said pistons and the other connecting the other side of the road wheel spindle to the other piston, means to supply fluid under pressure, and a control means to selectively permit flow of the fluid under pressure to either cylinder and flow from the other cylinder.

2. A pair of wheel supporting members each pivoted at one end on a vehicle frame member for oscillation substantially in the vertical plane, a pair of road wheel spindles one pivoted to one supporting member and the other to the other supporting member for oscillation in the horizontal plane, a pair of road wheels one mounted for rotation on one said spindle and the other on the other said spindle, each supporting member having formed in it a pair of cylinder bores having their axes horizontal and parallel and extended longitudinally in the supporting member, each of the said cylinder bores of each said supporting member having an associated piston reciprocable in the cylinder bore, each said road wheel spindle having an associated connected pair of link members one link member connecting one side of the road wheel spindle to one of the pistons in the associated supporting member and the other link member of the pair connecting the other side of the road wheel spindle to the other piston in the associated supporting member, and in combination means to supply fluid under pressure and a control means to selectively permit flow under pressure in selective manner to one cylinder bore of each pair of cylinder bores and flow from the other cylinder bore of each said pair of cylinder bores.

3. A wheel supporting member pivoted at one end on a vehicle frame member for oscillation substantially in the vertical plane, a road wheel spindle pivoted to said supporting member for oscillation in the horizontal plane, a road wheel mounted for rotation on said spindle, a pair of cylinder bores formed in said supporting member and with their axes substantially horizontal and parallel and extended in the supporting member longitudinally thereof, a pair of pistons each reciprocable in one of said cylinders, a pair of link members one connecting one side of the road wheel spindle to one of said pistons and the other connecting the other side of the road wheel spindle to the other piston, the pivot of the wheel supporting member on the vehicle frame member including a pair of pivot axles, a conduit from one associated cylinder to one pivot axle and a conduit from the other associated cylinder to the other pivot axle, and in combination, means to supply fluid under pressure and connecting conduits and control means to selectively permit flow under pressure through either pivot axle to its connected cylinder bore and flow from the other cylinder bore through its connected pivot axle.

4. A pair of wheel supporting members each pivoted at one end on a vehicle frame member for oscillation substantially in the vertical plane, a pair of road wheel spindles one pivoted to one supporting member and the other pivoted to the other supporting member for oscillation in the horizontal plane, a pair of road wheels one mounted for rotation on one said spindle and the other on the other said spindle, each supporting member having formed in it a pair of cylinder bores having their axes horizontal and parallel and extended longitudinally in the supporting member, each of the said cylinder bores of each said supporting member having an associated piston reciprocable in the cylinder bore, each said road wheel spindle having an associated connected pair of link members one link member connecting one side of the road wheel spindle to one of the pistons in the associated supporting member and the other link member of the pair connecting the other side of the road wheel spindle to the other piston in the associated supporting member, the pivot of each supporting member on the vehicle frame member including a pair of pivot axles, a conduit from one associated cylinder to one pivot axle and a conduit from the other associated cylinder to the other pivot axle, means to supply fluid under pressure, and a control means selectively permitting flow of fluid under pressure in selective manner through one pivot axle of each supporting member to its associated cylinder and flow from the other cylinder of the associated pair of cylinders through the other pivot axle of the supporting member.

References Cited in the file of this patent

UNITED STATES PATENTS

| 1,657,412 | Schneider | Jan. 24, 1928 |
| 1,947,973 | Davis | Feb. 20, 1934 |
| 1,981,591 | Edmondson | Nov. 20, 1934 |
| 2,111,668 | Latzen | Mar. 22, 1938 |
| 2,252,660 | Kulikoff | Aug. 12, 1941 |
| 2,554,261 | Munger | May 22, 1951 |
| 2,555,649 | Krotz | June 5, 1951 |
| 2,557,936 | Brown | June 26, 1951 |

FOREIGN PATENTS

| 705,758 | Germany | May 8, 1941 |